Dec. 23, 1952 R. J. KIRCHER 2,623,103

SEMICONDUCTOR SIGNAL TRANSLATING DEVICE

Filed June 9, 1949

INVENTOR
R. J. KIRCHER
BY [signature]
ATTORNEY

Patented Dec. 23, 1952

2,623,103

UNITED STATES PATENT OFFICE 2,623,103

SEMICONDUCTOR SIGNAL TRANSLATING DEVICE

Reymond J. Kircher, Summit, N. J., assignor to Bell Telephone Laboratories, Incorporated, New York, N. Y., a corporation of New York Application June 9, 1949, Serial No. 98,008

16 Claims. (Cl. 175—366)

This invention relates to semiconductor signal translating devices and more particularly to such devices of the type disclosed in the application, Serial No. 33,466, filed June 17, 1948 of J. Bardeen and W. H. Brattain now Patent 2,524,035, granted October 3, 1950.

Devices of this type, which are known as transistors, comprise, in one form, a body of semiconductive material, such as germanium, two closely adjacent point contacts, designated as the emitter and the collector, bearing against one face of the body, and a large area or ohmic connection, termed the base, to the opposite face of the body. Amplified replicas of signals impressed, for example, between the emitter and the base appear in a load or output circuit connected, for example, between the collector and the base.

Such devices, it has been found, when operated with the base as the common or grounded electrode, exhibit a substantial positive feedback impedance, specifically a resistance, of the order of one to several hundred ohms, common to the input and output circuits. For some applications, for example in amplifiers, such a feedback impedance may be undesirable as it leads to distortion and instability.

One general object of this invention is to improve the operating characteristics of semiconductor translating devices of the type described hereinabove. More specifically, one object of this invention is to reduce the positive feedback impedance in such devices.

In accordance with one feature of this invention, in a semiconductor translating device having emitter, collector and base connections as described above, the semiconductive body and the emitter and collector are constructed and arranged so that a low value of the positive feedback resistance, for example of about 10 ohms or less, obtains. Specifically, the body is formed to have therein a grain boundary which extends through the body, forms therein an NPN or PNP-type region and makes good electrical connection to the base, and the emitter and collector are brought to bear against the body on opposite sides of the grain boundary and in proximity to each other.

As an aid to understanding of this invention, a review of certain principles and terminology is in order here. As is known, semiconductive materials may be classed as of two types, termed N and P, depending upon their conductivity characteristics. N-type material is one which exhibits the smaller resistance to current flow between it and a contact thereto when the material is negative with respect to the contact; P-type material exhibits the smaller resistance when the material is positive with respect to the contact. The conductivity type of material may be controlled or predetermined in various ways, such as disclosed in the application, Serial No. 638,351, filed December 29, 1945 of J. H. Scaff and H. C. Theuerer in the case of germanium and in the application, Serial No. 793,744, filed December 24, 1947 of J. H. Scaff and H. C. Theuerer and Patents 2,402,661 and 2,402,662 of R. S. Ohl in the case of silicon.

A body of semiconductive material may have therein contiguous zones of opposite conductivity type. The interfacial region between two such zones is known as an NP junction or barrier.

Some crystal boundaries in such a body, it has been found, exhibit the characteristics of a zone of one conductivity type between two zones of the opposite conductivity type. Thus, in the case of a body of N-type germanium, the region at the crystal boundary has the characteristics of a thin P zone between two N zones and may be designated as an NPN junction. In the case of a body of P-type germanium, the region at the crystal boundary exhibits the characteristics of a thin N zone between two P zones and may be designated as a PNP junction.

Natural grain boundaries in semiconductors are usually very thin, of the order of tenths of a mil or less in width. They may be located, in some cases by microscopic examination of the body. They may be located also by passing a concentrated light spot along a surface of the body and observing the current flow between two connections to opposite end regions of this surface. As the light spot passes across a grain boundary a photo-current which reverses in direction is produced.

The invention will be described hereinafter with particular reference to translating devices including a body of high back voltage N-type germanium having an NPN crystal boundary therein. This material may be prepared, for example, as described in the application, Serial No. 638,351 referred to hereinabove. It will be understood, of course, that the invention may be embodied also in devices including a body of other semiconductive material, such as silicon, or wherein the body is of P-type material and the crystal boundary has the character of a PNP junction.

The invention and the above-noted and other features thereof will be understood more clearly and fully from the following detailed description with reference to the accompanying drawing in which.

Figure 1:
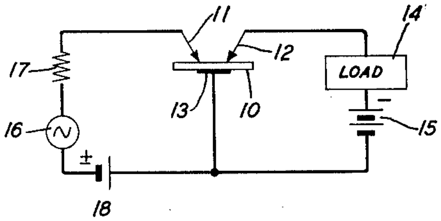
Fig. 1 is a diagram of a signal translating device of the type to which this invention pertains.

In Figs. 3 to 8 of the drawing, the devices have been illustrated to a greatly enlarged scale, as will appear presently from the specific dimensions given for typical devices. Also, in the drawing, the grain boundaries have been shown, for simplicity of illustration, as of fairly regular contour. It will be understood that in some actual devices, the boundary contours may be quite irregular.

Referring now to the drawing, the signal translating device illustrated in Fig. 1 comprises a body, disc or wafer 10 of semiconductive material, for example of high back voltage N-type germanium, having emitter and collector connections 11 and 12 respectively, which may be Phosphor bronze points, to one face thereof and a large area or ohmic base connection 13 to the other face thereof. The output circuit is connected between the collector 12 and base 13 and comprises a load 14 and a direct-current source 15 for biasing the collector in the reverse direction. When the body 10 is of N conductivity type material the collector is biased negative with respect to the body. In a typical device, the bias may be of the order of 10 to 100 volts relative to the base 13. The input circuit is connected between the emitter 11 and base 13 and comprises an alternating-current signal source 16, a resistor 17, which may be omitted in some cases, and a direct-current source 18 for biasing the emitter at a low potential of the order of 1 volt or less relative to the base 13. Usually the emitter is biased positive with respect to the body 10 when the body is of N-type material although in some cases the emitter bias may be negative.

Figure 2:
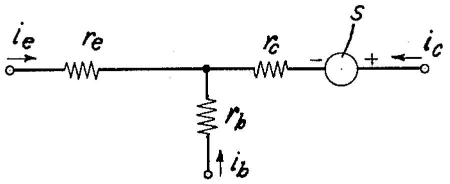
Fig. 2 is an equivalent circuit analog of the device illustrated in Fig. 1.

The semiconductor device illustrated in Fig. 1 may be represented by the equivalent circuit analog depicted in Fig. 2. In the latter figure, the emitter, collector and base impedances are represented by the resistors $r_e$, $r_c$ and $r_b$ respectively. In a typical device, the emitter resistance may be of the order of a few hundred ohms and the collector resistance $r_c$ may be of the order of 10,000 ohms. In devices of prior known construction, the base resistance $r_b$ usually is of the order of several hundred ohms. The equivalent circuit includes also a direct-current source S which represents the transfer current multiplication which obtains in the operation of the device. The emitter, collector and base currents are indicated by the arrows $i_e$, $i_c$ and $i_b$ respectively, the direction of current flow being in the conventional sense.

The base resistance $r_b$, it will be noted, is common to the input and output circuits and is in the nature of a positive feedback impedance. As has been indicated, in devices of known construction it is of substantial magnitude and thus in some applications, for example in amplifiers, is undesirable in that it tends to result in distortion and instability. An important feature of this invention is that this base or positive feedback impedance is reduced to a small value, for example of the order of 10 ohms or less.

Figure 3:
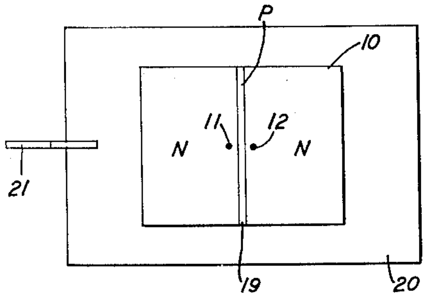
Figs. 3 and 4 are top and side diagrammatic views respectively showing the principal elements of a translating device constructed in accordance with this invention.
Figure 4:
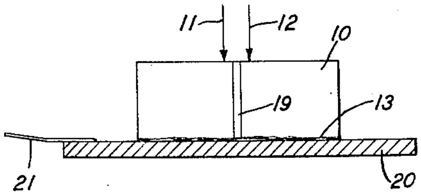

Figs. 3 and 4 illustrate the principal elements of a translating device constructed in accordance with this invention. As therein shown, the semiconductive body 10 has extending completely therethrough a grain boundary 19. When the body 10 is of N-type material, the grain boundary represents a P-type region interposed between two N-type regions as indicated by the letters N and P in Fig. 3. The semiconductive body 10 is mounted upon a metallic support 20 and connected thereto by the base connection 13 which is substantially coextensive with the face of the body 10 opposite the support 20. The base 13 may be, for example, a layer of highly conductive solder which serves to secure the body to the support 20. Alternatively, the base 13 may be of a highly conductive metallic layer electroplated upon the body 10. A lead-in connection 21 extends from the support 20.

As shown clearly in Fig. 3, the emitter and collector 11 and 12 bear against one face of the body 10 and are on opposite sides of the grain boundary 19. The spacing between the emitter and collector should be of the order of 2 to 3 mils. Also, as shown in Fig. 4, the grain boundary extends entirely through the body 10 and makes good electrical connection with the base 13.

In a typical device, the body 10 may be of the order of .020 inch thick, .050 inch long and .050 inch wide, the collector and emitter spacing being as noted hereinabove.

The placement of the emitter and collector on opposite sides of a grain boundary which extends through the semiconductive body and makes good electrical connection to the base 13 has been found to effect a marked reduction in positive feedback impedance $r_b$, of the order of magnitude indicated hereinabove.

Figure 5:
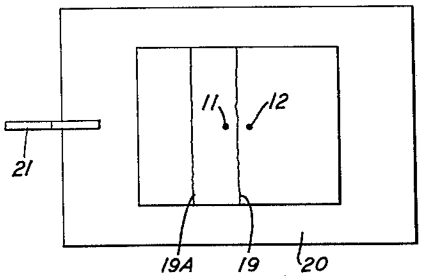
Figs. 5 and 6 are top and elevational views respectively of a semiconductor device illustrative of one embodiment of this invention.
Figure 6:
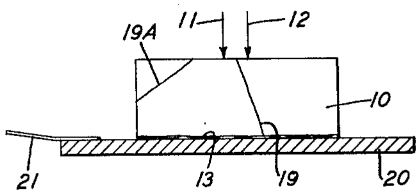

A body of semiconductive material, fabricated in the manners disclosed in the applications heretofore identified, may comprise two or more grain boundaries. For example, as illustrated in Figs. 5 and 6, there may be two boundaries 19 and 19A, only one of which, 19, extends through the body and connects to the base 13. Placement of the emitter and collector on opposite sides of this one boundary will result in the low value of positive feedback impedance whereas, if the emitter and collector contact the body 10 on opposite sides of the grain boundary 19A, which does not connect to the base 13, such low value of the impedance noted will not obtain.

Figure 7:
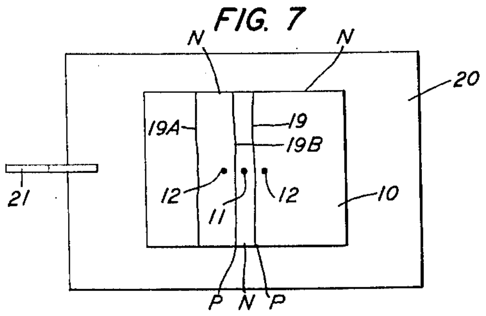
Figs. 7 and 8 are top and elevational views respectively of a device illustrative of another embodiment of this invention.
Figure 8:
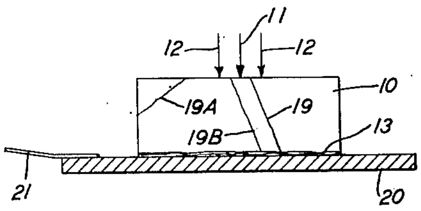

Figs. 7 and 8 illustrate a device embodying this invention wherein the body 10 has therein two closely adjacent grain boundaries 19 and 19B extending through the body. Contact points 11 and 12 are brought to bear against one surface of the body, with the contact point 11 and each contact 12 on opposite sides of a respective grain boundary 19 or 19B. The contact 11 may be operated as the emitter and the contacts 12 joined as collectors or operated independently as collectors with individual load circuits associated therewith. Alternatively, the contact 11 may be utilized as the collector and the two contacts 12 operated together as emitters. The spacing between the contact 11 and each contact 12 should be of the order of 2 to 3 mils.

Although specific embodiments of this invention have been shown and described, it will be understood that they are but illustrative and that various modifications may be made therein without departing from the scope and spirit of this invention.

What is claimed is:

1. A signal translating device comprising a semiconductive body having therein two zones of one conductivity type separated by a thin zone of the opposite conductivity type, emitter and collector connections to said two zones respectively and adjacent said thin zone, and a base connection to said body, said two and thin zones being connected to said base connection.

2. A signal translating device comprising a body of semiconductive material having therein and extending between two faces thereof an NPN junction, emitter and collector connections to one of said faces and on opposite sides of and adjacent said junction, and a base connection to the other of said faces, said junction being connected to said base connection.

3. A signal translating device comprising a body of semiconductive material having therein and extending between two faces thereof a PNP junction, emitter and collector connections to one of said faces and on opposite sides of and adjacent said junction, and a base connection to the other of said faces, said junction being connected to said base connection.

4. A signal translating device in accordance with claim 2 wherein said material is germanium.

5. A signal translating device in accordance with claim 3 wherein said material is germanium.

6. A signal translating device comprising a wafer of semiconductive material of one conductivity type having extending between its major faces a zone of said material of the opposite conductivity type and of the order of tenths of a mil wide, a pair of point contacts bearing against one of said faces and on opposite sides of said zone, and an ohmic connection to the other of said faces, said zone being connected to said connection.

7. A signal translating device comprising a wafer of N-type germanium having a zone of the order of tenths of a mil wide of P-type germanium extending between its major faces, a pair of point contacts bearing against one of said faces on opposite sides of said zone, and an ohmic connection to said zone at the other of said faces.

8. A signal translating device comprising a body of semiconductive material having a grain boundary extending therethrough and forming NP junctions with the adjacent material, a pair of electrical connections to said body and on opposite sides of said boundary, and a third electrical connection to said boundary.

9. A signal translating device in accordance with claim 8 wherein said material is germanium.

10. A signal translating device in accordance with claim 8 wherein said material is high back voltage N-type germanium.

11. A signal translating device comprising a body of semiconductive material having a grain boundary therein and extending between two faces thereof, said boundary forming asymmetric junctions with the adjacent material, emitter and collector connections to one of said faces and on opposite sides of said boundary, and a base connection to the other of said faces, said boundary intersecting said base connection.

12. A signal translating device comprising a wafer of semiconductive material having a grain boundary extending between the major faces thereof and defining an NPN type junction with the adjacent material, a pair of point contacts bearing against one of said faces on opposite sides of said boundary, and an ohmic connection to the other of said faces and connected to said boundary.

13. A signal translating device in accordance with claim 12 wherein said material is germanium and said contacts are spaced of the order of 0.002 inch.

14. A signal translating device comprising a body of semiconductive material having therein three adjacent zones of one conductivity type, each two adjacent zones having therebetween a zone of the opposite conductivity type, individual rectifying connections to each of said three zones, and a connection to the zones of opposite conductivity type.

15. A signal translating device comprising a body of semiconductive material having therein a pair of adjacent grain boundaries extending between two faces thereof, said boundaries dividing said body into three zones, point contacts, one for each of said zones, bearing against one of said faces, and a base connection on the other of said faces and connected to said grain boundaries.

16. A signal translating device in accordance with claim 15 wherein said material is germanium.

REYMOND J. KIRCHER.

REFERENCES CITED

The following references are of record in the file of this patent:

UNITED STATES PATENTS

| Number | Name | Date |
|---|---|---|
| 1,900,018 | Lillienfeld | Mar. 7, 1933 |
| 2,561,411 | Pfann | July 24, 1951 |
| 2,570,978 | Pfann | Oct. 9, 1951 |
| 2,586,080 | Pfann | Feb. 19, 1952 |